(12) United States Patent  (10) Patent No.: US 8,435,158 B2
Mizoguchi et al.  (45) Date of Patent: May 7, 2013

(54) PTO CONTROL DEVICE

(75) Inventors: Kenichi Mizoguchi, Fujisawa (JP);
Masao Okada, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 289 days.

(21) Appl. No.: 12/864,545

(22) PCT Filed: Jan. 29, 2009

(86) PCT No.: PCT/JP2009/051455

§ 371 (c)(1),
(2), (4) Date: Jul. 26, 2010

(87) PCT Pub. No.: WO2009/096463

PCT Pub. Date: Aug. 6, 2009

(65) Prior Publication Data

US 2010/0331142 A1  Dec. 30, 2010

(30) Foreign Application Priority Data

Jan. 31, 2008  (JP) .................................. 2008-020593

(51) Int. Cl.
*B60W 10/10* (2012.01)

(52) U.S. Cl.
USPC ......................................................... 477/111

(58) Field of Classification Search .................. 477/107, 477/110, 111; 180/53.1, 53.6, 53.7, 53.8
See application file for complete search history.

(56) References Cited

U.S. PATENT DOCUMENTS

| | | | | |
|---|---|---|---|---|
| 5,237,883 A | * | 8/1993 | Churchill et al. ................ | 74/11 |
| 5,611,751 A | * | 3/1997 | Ehrenhardt et al. ............ | 477/73 |
| 6,363,906 B1 | | 4/2002 | Thompson et al. | |
| 7,702,450 B2 | * | 4/2010 | Pfohl et al. ..................... | 701/112 |
| 2007/0288154 A1 | * | 12/2007 | Letang .......................... | 701/112 |

FOREIGN PATENT DOCUMENTS

| | | |
|---|---|---|
| JP | 09-301009 A1 | 11/1997 |
| JP | 11-115404 A1 | 4/1999 |
| JP | 2003-526045 A1 | 9/2003 |
| JP | 2005-343414 A1 | 12/2005 |

OTHER PUBLICATIONS

PCT Search Report for Serial No. PCT/JP2009/051455 dated Feb. 12, 2009.

* cited by examiner

*Primary Examiner* — David D Le
*Assistant Examiner* — David J Hlavka
(74) *Attorney, Agent, or Firm* — McCormick, Paulding & Huber LLP

(57) ABSTRACT

The present invention provides a PTO switch mode control device that is capable of performing appropriate idle shutdown when an engine is started, even in the case where an ignition switch is turned ON with a PTO switch ON when the engine is stopped. The PTO switch mode control device has: an ignition switch 3 that is turned ON or OFF to start and stop an engine 1; a PTO switch 4 that is turned ON or OFF to select switch a PTO mode that permits power takeoff, and an inactive mode that does not permit the power takeoff; and an ECU 2 that executes idle shutdown to stop the engine 1 when the engine 1 continuously idles for a predetermined time period, except for the PTO mode state. The ECU 2 functions to establish the inactive mode even when the PTO switch 4 is ON, when the ignition switch 3 is turned ON while the PTO switch 4 is ON, and subsequently establish the PTO mode when the PTO switch is switched from OFF to ON.

4 Claims, 3 Drawing Sheets

PTO CONTROL DEVICE

CROSS REFERENCE TO RELATED APPLICATIONS

This application is entitled to the benefit of and incorporates by reference essential subject matter disclosed in International Patent Application No. PCT/JP2009/051455 filed on Jan. 29, 2009 and Japanese Patent Application No. 2008-020593 filed Jan. 31, 2008.

TECHNICAL FIELD

The present invention relates to a PTO control device that controls the modes of a PTO switch for switching between a PTO mode that permits power takeoff and an inactive mode that does not permit the power takeoff.

BACKGROUND ART

There are some known special vehicles with power takeoff mechanisms that takeoff part or all of the drive force of engines for moving the vehicles in order to drive driven equipment (dump trucks, winches, mixer, fire pumps, etc.).

These types of vehicles are provided with PTO switches for switching between a PTO mode that permits power takeoff and an inactive mode that does not permit the power takeoff. When the PTO switch is turned ON, the PTO mode is obtained, and when the PTO switch is turned OFF, the inactive mode is obtained. Some of these vehicles mentioned above execute idle shutdown for stopping the engines when the engines continuously idle for a predetermined time period.

When executing power takeoff the PTO switch needs to be turned ON. However, because the idle shutdown is not required during the power takeoff under the regulations (Note 1), the idle shutdown may not be performed when the PTO switch is turned ON to establish the PTO mode.

Note that Japanese Patent Application Publication No. 2005-343414 is known as a prior technology related to PTO.

Note 1: See the website for GARB (California Air Resources Board) (http://www.arb.ca.gov/regact/hdvidle/hdvidle.htm)

DISCLOSURE OF THE INVENTION

Incidentally, in the case where an engine is stopped by turning an ignition switch OFF while the PTO switch ON, the PTO switch remains ON even after the engine is stopped, because the PTO switch is of a toggle type. Therefore, when the ignition switch is turned ON to start the engine next time, the PTO mode is established immediately after starting the engine. For this reason, a user who continuously uses a vehicle while the PTO switch is ON at all times never performs idle shutdown.

FIG. 3 shows a flowchart associated with recognition of a conventional PTO switch.

When an ignition switch is ON in step 1A, step 2A determines whether the PTO switch is ON or OFF. When the PTO switch is ON, XPTOEN is 1 and the PTO mode is established in step 3A, whereby PTO becomes valid in step 4A. When the PTO switch is OFF in step 2A, XPTOEN is 0 and the inactive mode is established in step 5A, whereby PTO becomes inactive in step 6A.

Here, when the ignition switch is turned OFF with the PTO switch ON (see step 7A), and subsequently the ignition switch is turned ON in step 1A, XPTOEN is recognized as 1 due to the ON state of the PTO switch, and therefore the PTO mode is maintained subsequently. For this reason, as described above, the user who continuously uses the vehicle such as to only turn the ignition switch ON and OFF while keeping the PTO switch ON at all times never performs idle shutdown.

In view of the circumstances explained above, an object of the present invention is to provide a PTO control device that is capable of performing appropriate idle shutdown when an engine is started, even in the case where an ignition switch is turned OFF with a PTO switch ON when the engine is stopped.

In order to achieve the object mentioned above, the present invention is a PTO control device, having: an ignition switch that is turned ON or OFF to start and stop an engine; a PTO switch that is turned ON or OFF to select a PTO mode that permits power takeoff or an inactive mode that does not permit the power takeoff; and a controller that executes idle shutdown to stop the engine when the engine continuously idles for a predetermined time period, except for the PTO mode state, wherein the controller functions to establish the inactive mode even when the PTO switch is ON, when the ignition switch is turned ON while the PTO switch is ON, and subsequently establish the PTO mode when the PTO switch is switched from OFF to ON.

It is preferred that the PTO switch be of a toggle type.

The controller may keep the inactive mode even when it is detected that the PTO switch is switched from OFF to ON, until a predetermined time period KTIME elapses since the ignition switch is turned ON.

It is preferred that the predetermined time period KTIME be a time period from when the engine is started to when an operation of the engine becomes stable.

According to the PTO control device of the present invention, even when the engine is started by turning the ignition switch ON while the PTO switch is ON when the engine is stopped, appropriate idle shutdown can be performed.

BEST MODE FOR CARRYING OUT THE INVENTION

Preferred embodiments of the present invention are described based on the accompanying diagrams.

Figure 1:
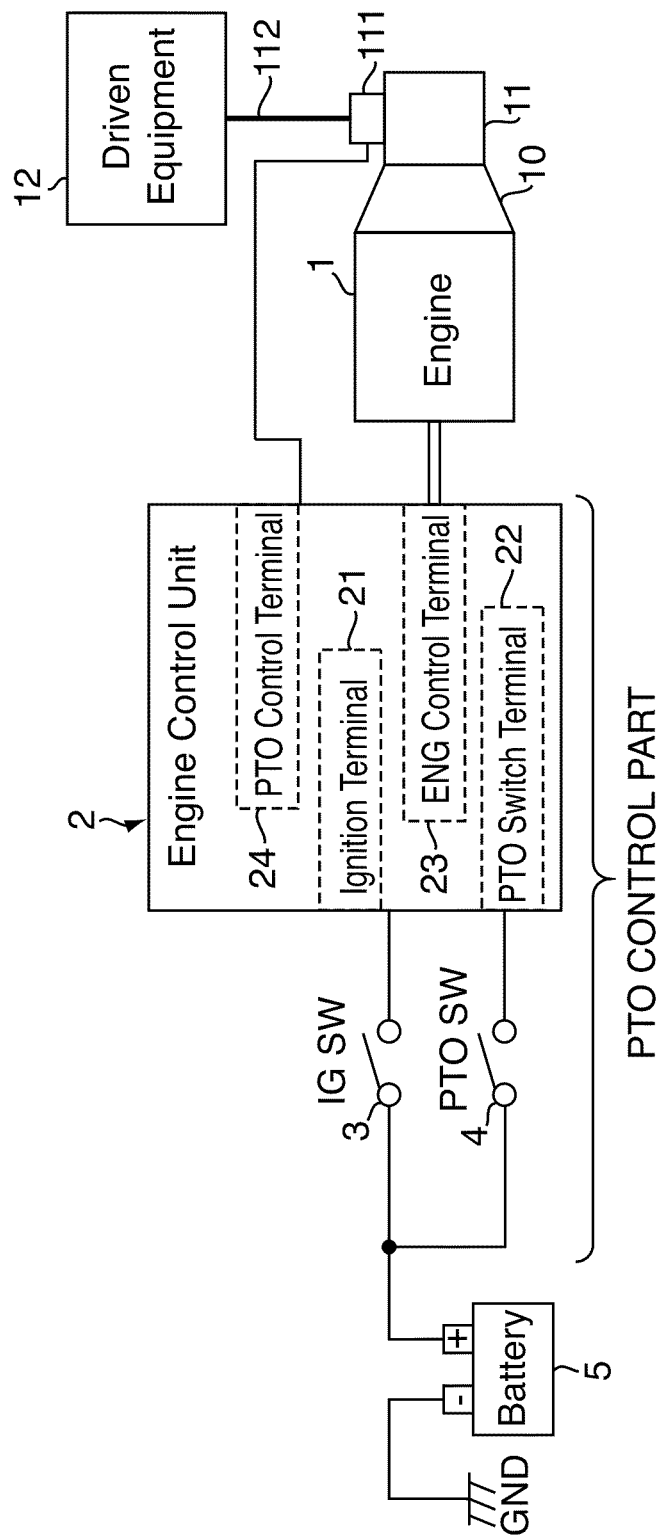
FIG. 1 is an explanatory diagram schematically showing a PTO control device according to an embodiment of the present invention.

FIG. 1 is an explanatory diagram schematically showing a PTO control device according to the present embodiment.

An engine 1, which moves a vehicle and drives a driven equipment 12 of a power takeoff, is connected with an engine control unit 2 (to be referred to as "ECU 2" hereinafter). An ignition switch 3 that is turned ON or OFF to start or stop the engine 1, and a PTO switch 4 that is turned ON or OFF to select a PTO mode that permits power takeoff or an inactive mode that does not permit the power takeoff, are connected with the ECU 2. These switches 3, 4 are connected with a battery 5. A so-called toggle switch is used as the PTO switch 4.

The engine 1 is, for example, a diesel engine. A transmission 11 is coupled to the engine 1 by a clutch 10. The transmission 11 is provided with a power takeoff mechanism 111 for takeoff power. The power takeoff mechanism 111 has a propeller shaft 112 that is connected in a disconnectable manner to an output shaft of the transmission 11, and the driven equipment 12 is connected with this propeller shaft 112. Note that the power takeoff mechanism may not be limited to a transmission PTO described above and may be a flywheel PTO that extracts power from a flywheel of the engine 1.

The ignition switch 3 and the PTO switch 4 are arranged in a driver's cabin of the vehicle. The PTO switch 4 is an alternate switch that is capable of being switched between ON and OFF and keeping that switched state.

The ECU 2 has an ignition terminal 21 that is electrically connected with the battery 5 by the ignition switch 3, a PTO switch terminal 22 that is electrically connected with the battery 5 by the PTO switch 4, an engine control terminal 23 that is communicably connected with an actuator (e.g., an injector or the like) of the engine 1, and a power takeoff mechanism control terminal 24 that is communicably connected with the power takeoff mechanism 111 of the transmission 11.

The ECU 2 controls activation and inactivation of the power takeoff mechanism 111. In other words, in the PTO mode the ECU 2 transmits the power of the engine 1 to the driven equipment 12 through the propeller shaft 112 of the power takeoff mechanism 111. In the inactive mode, on the other hand, the ECU 2 inactivates the power takeoff mechanism 111 by terminating the connection between the propeller shaft 112 and the transmission 11.

The ECU 2 basically executes idle shutdown for stopping the engine 1 when the engine 1 continuously idles for a predetermined time period, but, in a special case, does not perform the idle shutdown in the PTO mode state. In other words, the ECU 2 functions to execute the idle shutdown for stopping the engine 1 when the engine 1 continuously idles for the predetermined time period, except for the PTO mode state. The ECU 2 corresponds to a controller described in Patent Claims. The ECU 2 executes the idle shutdown only in the inactive mode.

When executing the idle shutdown, for example, a timer or a counter is used for measuring the time that elapses since the engine 1 starts idling when the vehicle is parked, and, when the measured time exceeds the predetermined time period mentioned above, the fuel supply from an injector to the engine 1 is stopped, and/or the supply of intake air to the engine 1 is stopped by blocking an intake throttle valve (not shown) provided in an intake pipe. In this manner, the engine 1 is automatically stopped.

In addition, when the engine is stopped, and when the ignition switch 3 is turned OFF and then ON again while the PTO switch 4 is ON, the ECU 2 functions to establish the inactive mode even when the PTO switch 4 is ON, and, subsequently, shift the inactive mode to the PTO mode, based on the condition that the PTO switch 4 is turned from OFF to ON.

Therefore, in the case where a user stops the engine 1 by turning the ignition switch 3 OFF with the PTO switch 4 ON, and when the user starts the engine 1 thereafter, the inactive mode is established while the PTO switch 4 is apparently ON. As described above, because the inactive mode is established even when the PTO switch 4 is apparently ON, when the engine 1 is started thereafter, the idle shutdown can be executed appropriately.

Although the PTO switch 4 is apparently ON in the inactive state after the engine is started, the driven equipment 12 that is driven by the power takeoff is not activated even when the user turns ON an activation switch of the driven equipment 12, as long as the inactive mode is established. By allowing the user to switch the PTO switch 4 from OFF to ON and shift from the inactive mode to the PTO mode, the driven equipment 12 can be activated.

Specifically, the inactive mode after the engine is started is subsequently shifted to the PTO mode by allowing the user to switch from OFF to ON the PTO switch 4 that is apparently ON. Because the idle shutdown is not carried out in this PTO mode, the idle shutdown is not performed in a state where the driven equipment 12 driven by the power takeoff is activated by turning the activation switch of the driven equipment 12 ON.

In summary, when the ignition switch 3 is turned OFF, the inactive mode is established even when the PTO switch 4 is ON. Thus, when the ignition switch 3 is turned ON thereafter to start the engine 1, the inactive mode is established not only when the PTO switch 4 has always been OFF, but also when the PTO switch 4 has always been ON. Then, in this inactive mode, the idle shutdown is executed appropriately without activating the driven equipment 12 that is driven by the power takeoff.

In order to activate the driven equipment 12, the PTO switch 4 may be switched from OFF to ON to establish the PTO mode after turning the ignition switch 3 ON. In the PTO mode, the driven equipment 12 can be activated, and the idle shutdown is not performed.

In this manner, the user who simply turns the ignition switch 3 ON and OFF with the PTO switch 4 ON can be allowed to appropriately execute the idle shutdown according to need.

Figure 2:
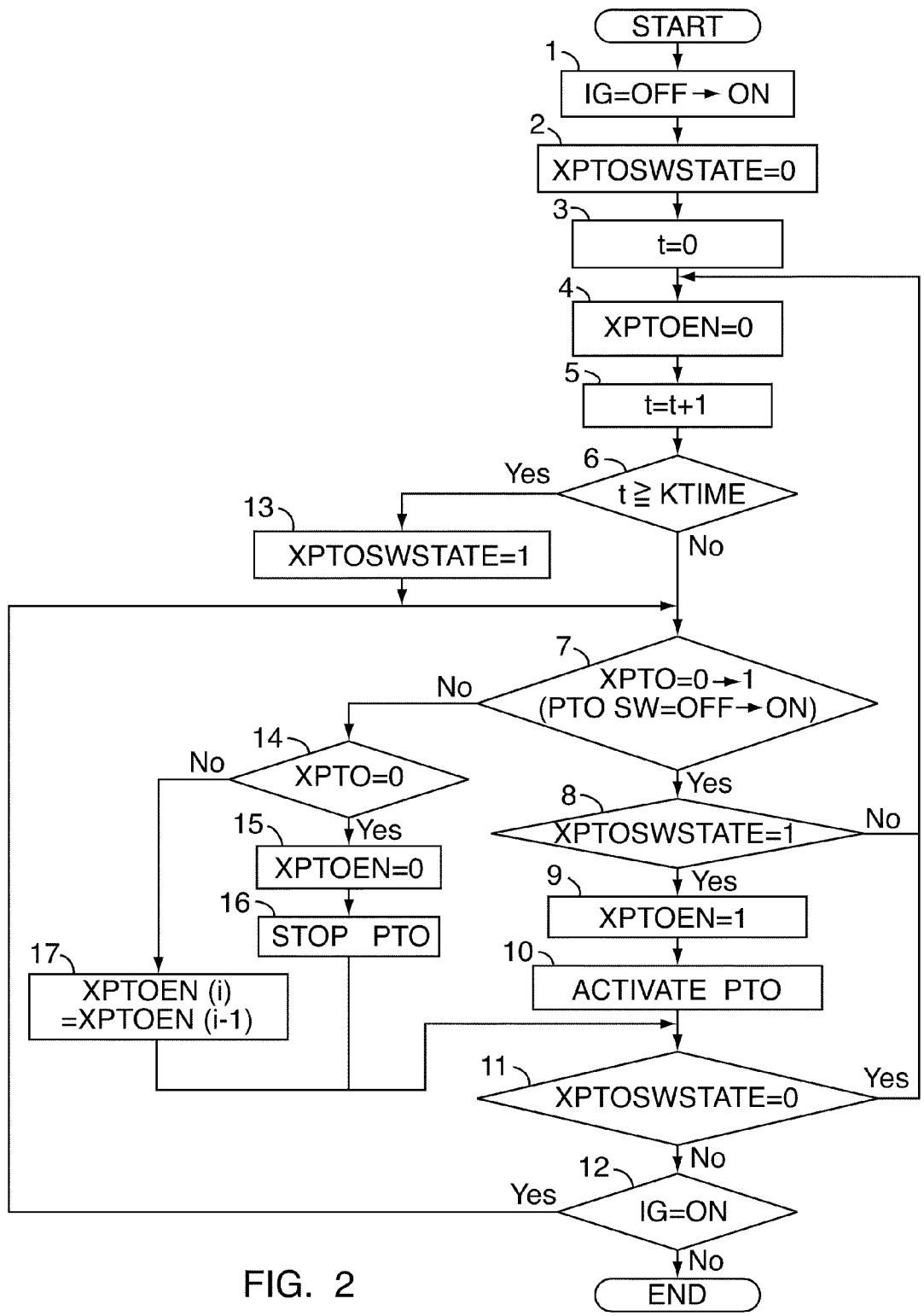
FIG. 2 is a flowchart associated with recognition of a PTO switch according to the present embodiment.
Figure 3:
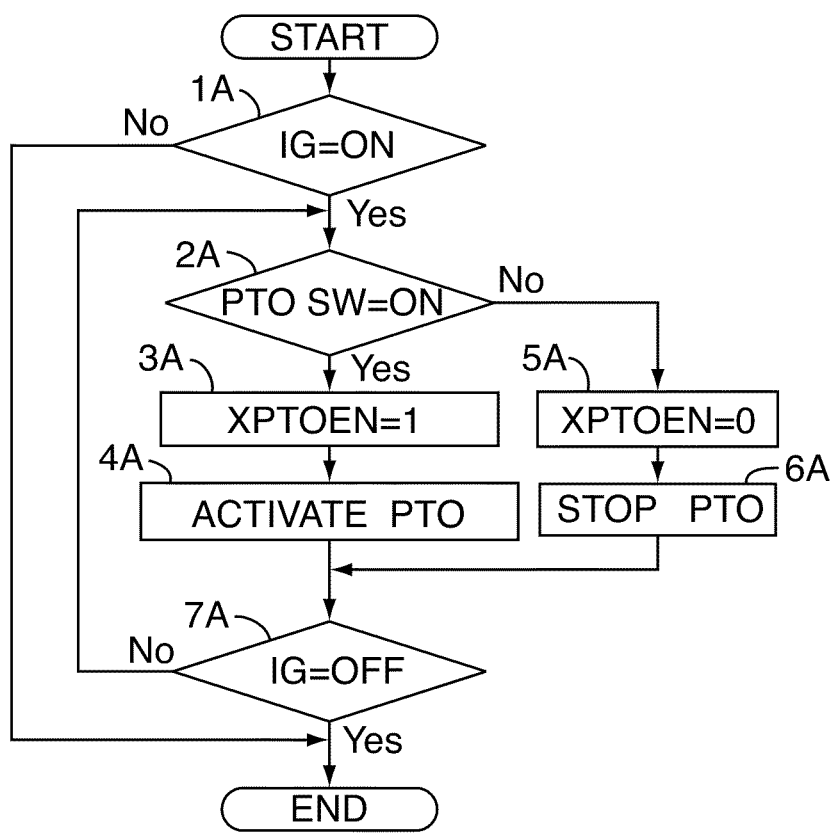
FIG. 3 is a flowchart associated with recognition of a conventional PTO switch.

FIG. 2 shows a flowchart associated with recognition of the PTO switch according to the present embodiment.

"IG" in steps 1, 12 is a flag indicating the state of the ignition switch 3. When "IG" is 1 the ignition switch 3 is apparently ON. When "IG" is 0 the ignition switch 3 is apparently OFF.

The flag "IG" becomes 1 when the ignition switch 3 is closed and the ignition terminal 21 of the ECU 2 is connected with the battery 5, and becomes 0 when the ignition switch 3 is opened.

"XPTOSWSTATE" in steps 2, 8, 11, 13 is a validity determination flag for the PTO switch 4. When "XPTOSWSTATE" is 1 the PTO switch 4 is determined to be valid. When "XPTOSWSTATE" is 0 the PTO switch 4 is determined to be invalid.

"KTIME" in step 6 is a flag for counting the time when "XPTOSWSTATE" becomes valid. As shown in steps 6, 13, when a time t that is counted by the timer after starting the engine does not exceed "KTIME," "XPTOSWSTATE" does not become 1 and the PTO switch 4 is determined to be invalid. "KTIME" is the time until the operation of the engine 1 becomes stable after starting the engine, and the driven equipment 12 is not driven even when the PTO switch 4 is turned ON by the time of "KTIME" after the engine is started.

"XPTO" in steps 7, 14 is an ON/OFF flag for the PTO switch 4. "XPTO" becomes 1 when the PTO switch 4 is turned ON. "XPTO" becomes 0 when the PTO switch 4 is turned OFF. When "XPTO" is 1 the PTO switch 4 can become valid (see step 9), but when "XPTO" is 0 the PTO switch 4 cannot be valid (see step 15).

The flag "XPTO" is switched to 1 or 0 in conjunction with the ON/OFF of the PTO switch 4. The flag "XPTO" becomes 1 when the PTO switch 4 is closed and the PTO switch terminal 22 of the ECU 2 is connected with the battery 5, and becomes 0 when the PTO switch 4 is opened.

"XPTOEN" in steps 4, 9, 15, 17 is a flag for determining that the PTO switch 4 is valid. When "XPTOEN" is 1 the PTO switch 4 is active. When "XPTOEN" is 0 the PTO switch 4 is invalid. In addition, when "XPTOSWSTATE" is 1 and "XPTOEN" is 1, the PTO mode is established. When "XPTOEN" is 0, the inactive mode is established regardless of whether "XPTOSWSTATE" is 1 or 0.

As shown in the flow from step 7 to step 8 this flowchart, when the ignition switch 3 is turned OFF as shown in step 12 while the PTO switch 4 is ON, "XPTOSWSTATE" and "XPTOEN" are reset to 0 as shown in steps 2, 4 after the subsequent start of the engine as shown in step 1. Therefore, the PTO mode (PTO state) is not established. At this moment, because the "XPTOEN" is 0 and the inactive mode state is established, control of the idle shutdown is executed appropriately. For example, the ECU 2 validates the control of the idle shutdown in step 4. In other words, the control is started when the control of the idle shutdown is not executed, and the control is continued when it is already executed.

Based on the condition that the PTO switch 4 is switched from OFF to ON in step 7, "XPTOEN" becomes 1 in step 9 and the PTO (power takeoff) is activated in step 10.

Whether the PTO switch 4 is switched from OFF to ON or not in step 7 is detected by, for example, determining that the PTO switch 4 is switched from OFF to ON if "XPTO" in the previous control cycle is 0 when the value of "XPTO" in the current control cycle is 1 in step 7. Therefore, in step 7, it is preferred that the value of "XPTO" be stored until the next control cycle.

Moreover, in step 10, the ECU 2 shifts the inactive mode to the PTO mode to invalidate the control of the idle shutdown. For example, the ECU 2 stops measuring the idling operation time and resets the timer used for the measurement. Furthermore, when the PTO mode is established, the ECU 2 controls the injector of the engine 1 and increases the idle speed of the engine 1 from the rotation speed that is set for moving the vehicle to the base rotation speed for a work of the driven equipment 12 that is set according to the load on the driven equipment 12. The ECU 2 also controls the power takeoff mechanism 111 and reduces the load when necessary (by engaging PTO gears, etc.) In this manner, the PTO is activated immediately in step 10.

When the PTO switch 4 is not switched from OFF to ON in step 7, that is, when the PTO switch 4 stays OFF or ON, the ECU 2 proceeds from step 7 to step 14. When the PTO switch 4 is OFF, "XPTOEN" becomes 0 in step 15, and the PTO (power takeoff) is stopped in step 16.

Also when the PTO switch 4 is switched OFF during the PTO mode, the ECU 2 proceeds from step 14 to step 15 and validates the control of the idle shutdown in step 15.

When "XPTOSWSTATE" is 0 in step 11, "XPTOEN" is set at 0 in step 4 and the inactive mode is established. In addition, when the ignition switch 3 is OFF in step 12, the process is ended.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A power take off control device, comprising:
an ignition switch that is turned ON or OFF to start or stop an engine;
a PTO switch that is turned ON or OFF to select a PTO mode that permits power takeoff or an inactive mode that does not permit the power takeoff; and
a controller that executes idle shutdown to stop the engine when the engine continuously idles for a predetermined time period, except for when the PTO mode is established,
wherein the controller functions to establish the inactive mode even when the PTO switch is ON, when the ignition switch is turned ON while the PTO switch is ON, and subsequently establish the PTO mode when the PTO switch is switched from OFF to ON.

2. The power take off control device according to claim 1, wherein the PTO switch is of a toggle type.

3. The power take off control device according to claim 1, wherein the controller keeps the inactive mode even when it is detected that the PTO switch is switched from OFF to ON, until a predetermined time period elapses since the ignition switch is turned ON.

4. The power take off control device according to claim 3, wherein the predetermined time period is a time period from when the engine is started to when an operation of the engine becomes stable.

* * * * *